US012681566B2

(12) United States Patent
Dal Zotto

(10) Patent No.: US 12,681,566 B2
(45) Date of Patent: Jul. 14, 2026

(54) VISIBILITY OF FRAMES

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/689,058

(22) PCT Filed: Sep. 27, 2021

(86) PCT No.: PCT/US2021/052189
§ 371 (c)(1),
(2) Date: Mar. 4, 2024

(87) PCT Pub. No.: WO2023/048729
PCT Pub. Date: Mar. 30, 2023

(65) Prior Publication Data
US 2024/0370081 A1 Nov. 7, 2024

(51) Int. Cl.
*G06F 3/01* (2006.01)
*G06V 40/16* (2022.01)
*G06F 3/16* (2006.01)

(52) U.S. Cl.
CPC .............. *G06F 3/012* (2013.01); *G06F 3/013* (2013.01); *G06F 3/165* (2013.01); *G06V 40/161* (2022.01)

(58) Field of Classification Search
CPC .......... G06F 3/012; G06F 3/013; G06F 3/165; G06V 40/161; G06V 10/82; G06V 40/171; H04N 7/147; H04N 23/611
See application file for complete search history.

(56) References Cited

U.S. PATENT DOCUMENTS

| | | | | |
|---|---|---|---|---|
| 9,800,931 | B1* | 10/2017 | Tangeland | ......... H04N 21/4312 |
| 10,268,911 | B1* | 4/2019 | Wu | ..................... G06V 40/171 |
| 11,228,625 | B1* | 1/2022 | Libin | ..................... H04L 65/403 |
| 11,317,060 | B1* | 4/2022 | Libin | ..................... H04N 7/157 |
| 11,632,258 | B1* | 4/2023 | Libin | ..................... G06F 3/165 |
| | | | | 709/204 |
| 11,916,985 | B1* | 2/2024 | Costello | ................ H04L 65/403 |
| 2009/0123035 | A1* | 5/2009 | Khouri | ................... G06V 20/52 |
| | | | | 382/115 |
| 2009/0147141 | A1* | 6/2009 | Lee | ...................... H04N 23/611 |
| | | | | 348/576 |
| 2009/0195638 | A1* | 8/2009 | Caspi | ..................... H04N 5/272 |
| | | | | 348/14.09 |
| 2010/0293468 | A1* | 11/2010 | Thijssen | ................. G06F 3/165 |
| | | | | 715/800 |
| 2011/0263946 | A1* | 10/2011 | el Kaliouby | ............. A61B 5/16 |
| | | | | 600/300 |
| 2013/0243278 | A1* | 9/2013 | Saito | ................... G06V 10/993 |
| | | | | 382/128 |

(Continued)

FOREIGN PATENT DOCUMENTS

| | | |
|---|---|---|
| WO | 2016/061780 A1 | 4/2016 |
| WO | 2020/222785 A1 | 11/2020 |

*Primary Examiner* — Ibrahim A Khan
(74) *Attorney, Agent, or Firm* — Quarles & Brady LLP

(57) ABSTRACT

In some examples, an electronic device includes an image sensor and a processor to determine a facial landmark count of a frame captured by the image sensor and adjust, responsive to the facial landmark count, a visibility of the frame.

19 Claims, 7 Drawing Sheets

700

700

(56)             References Cited

U.S. PATENT DOCUMENTS

| | | | |
|---|---|---|---|
| 2014/0368604 A1* | 12/2014 | Lalonde ................... | H04N 7/15 |
| | | | 348/14.08 |
| 2014/0376785 A1* | 12/2014 | Bathiche ................ | H04N 7/147 |
| | | | 382/118 |
| 2016/0191995 A1* | 6/2016 | el Kaliouby ......... | H04N 21/812 |
| | | | 725/12 |
| 2017/0017838 A1* | 1/2017 | Biswas ............... | G06F 16/7837 |
| 2017/0178306 A1* | 6/2017 | Le Clerc ........... | G06V 10/7715 |
| 2018/0121762 A1* | 5/2018 | Han ....................... | G06V 10/82 |
| 2019/0007623 A1* | 1/2019 | Wang ..................... | H04N 7/147 |
| 2020/0150462 A1* | 5/2020 | Cermak ................ | G02F 1/0121 |
| 2020/0358983 A1* | 11/2020 | Astarabadi ............ | H04N 7/157 |
| 2021/0192198 A1* | 6/2021 | Tulyakov ........... | G06F 18/2148 |
| 2021/0271911 A1* | 9/2021 | Song ...................... | G06V 40/40 |
| 2022/0237735 A1* | 7/2022 | Zingade ................ | G06T 3/4038 |
| 2022/0366542 A1* | 11/2022 | Toyohara ................. | G06T 5/70 |
| 2023/0161378 A1* | 5/2023 | Zhu ........................ | G09G 5/003 |
| | | | 345/173 |
| 2023/0334754 A1* | 10/2023 | Kirchmayer ........... | G06T 15/04 |
| 2024/0259524 A1* | 8/2024 | Li .......................... | G06V 40/20 |

* cited by examiner

300

308

Determine a facial landmark count — 310

Based on the facial landmark count, adjust a visibility of the frame — 312

304
Image Sensor

302
Processor

VISIBILITY OF FRAMES

BACKGROUND

Electronic devices such as notebooks, laptops, desktops, tablets, and smartphones include image sensors that enable the electronic devices to capture images. During a video-conference, an electronic device utilizes an image sensor to enable a user to share audiovisual data with an audience, for instance.

BRIEF DESCRIPTION OF THE DRAWINGS

Various examples are described below referring to the following figures.

DETAILED DESCRIPTION

Figure 1:
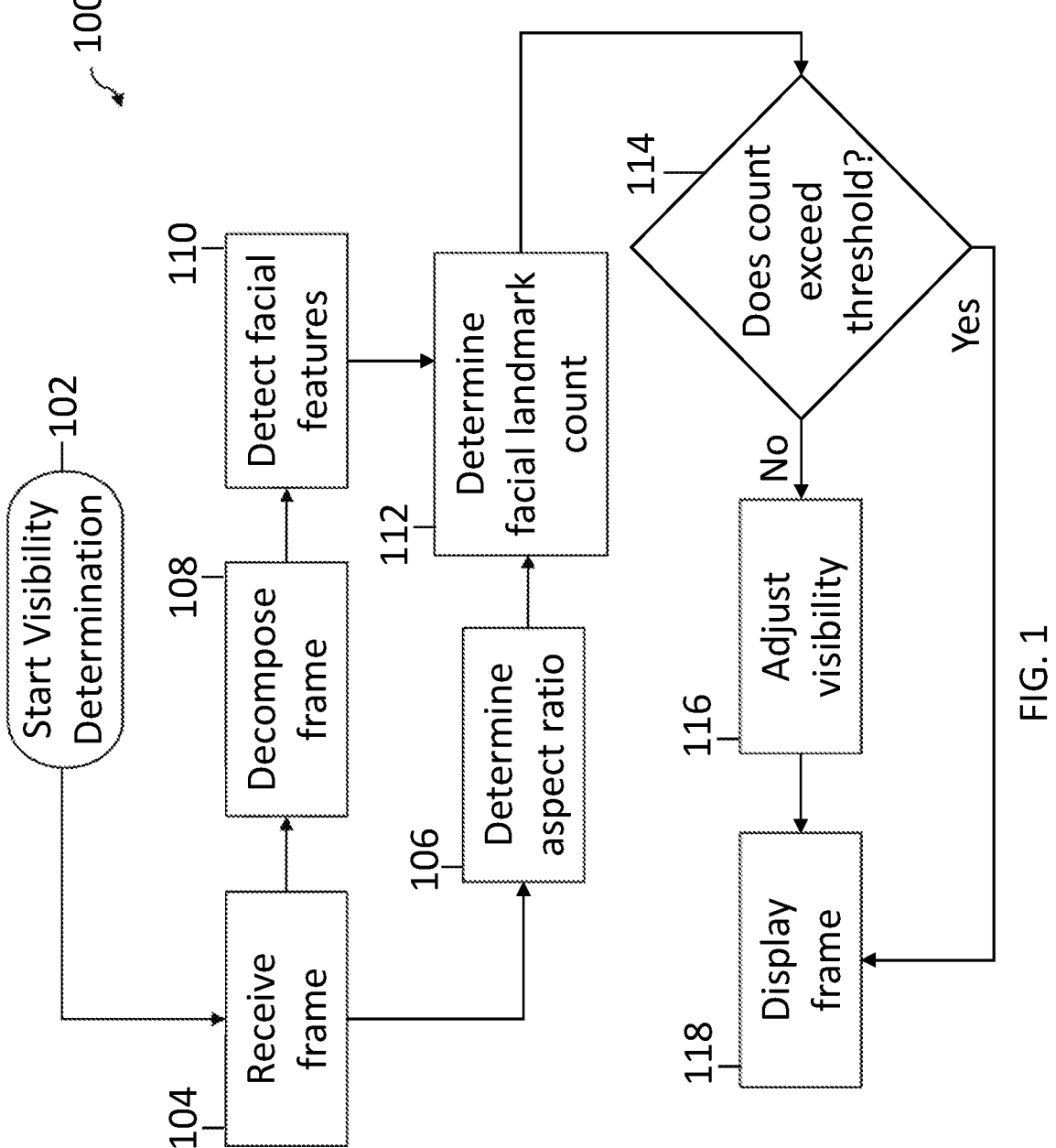
FIG. 1 is a flow diagram depicting a method for an electronic device to control visibility of frames, in accordance with various examples.

As described above, electronic devices include image sensors that enable the electronic devices to share video signals with an audience. In some instances, the user turns or moves away from the image sensor to attend to another task and the image sensor captures background features (e.g., undesirable angles of the user, objects not intended for display, etc.) that distracts the audience and embarrasses the user, reducing an effectiveness of communication between the user and the audience and impacting user productivity.

To reduce distractions for the audience and enhance communication between the user and the audience by preventing unwanted transmissions of background features, an electronic device adjusts a visibility of a video signal based on a facial landmark count within a frame of the video signal. Visibility, as used herein, is an opacity of the frame such that 0% opacity indicates contents of the frame are viewable and 100% opacity indicates contents of the frame are not viewable. The electronic device receives the frame, determines an aspect ratio of the frame to determine a height and a width of the frame, and decomposes the frame to detect facial features. The height and width of the frame is expressible in units of pixels that each have unique coordinates in a two-dimensional plane (e.g., an x-y plane). The facial features include a forehead, eyebrows, eyes, a nose, lips, a hairline, cheekbones, a jawline, or a combination thereof. The electronic device determines the facial landmark count by determining whether facial landmark points of the facial features are within the frame. A facial landmark point, as used herein, is a coordinate associated with a facial feature. The facial landmark count is determinable by comparing the coordinate associated with a facial landmark point to the coordinates of the pixels of the frame. Responsive to a determination that the facial landmark count is less than a threshold, the electronic device adjusts the visibility of the frame. In some examples, the electronic device adjusts the visibility by an amount determined by a multiplier that is based on the facial landmark count such that the amount of the adjustment increases as the facial landmark count decreases. In various examples, the electronic device mutes a microphone as well as adjusts the visibility of the frame. The electronic device causes a display device to display the frame having the adjusted visibility, a network interface to transmit the frame having the adjusted visibility, or a combination thereof.

Utilizing the electronic device that adjusts the visibility of the frame based on the facial landmark count within the frame provides for an enhanced user and audience experience by reducing distractions for the audience. Enhancing the effectiveness of communication between the user and the audience enhances user productivity.

In some examples in accordance with the present description, an electronic device is provided. The electronic device includes an image sensor and a processor. The processor is to determine a facial landmark count of a frame captured by the image sensor and adjust, responsive to the facial landmark count, a visibility of the frame.

In other examples in accordance with the present description, an electronic device is provided. The electronic device includes an image sensor and a processor. The processor is to determine whether a facial landmark count of a frame captured by the image sensor exceeds a threshold. Responsive to a determination that the facial landmark count is less than the threshold, the processor is to adjust a visibility of the frame and cause a display device to display the frame that has the adjusted visibility. Responsive to a determination that the facial landmark count exceeds the threshold, the processor is to cause the display device to display the frame.

In yet other examples in accordance with the present description, a non-transitory machine-readable medium storing machine-readable instructions is provided. The machine-readable instructions, when executed by a processor of an electronic device, cause the processor to determine a facial landmark count of a frame captured by an image sensor, adjust a visibility of the frame by a multiplier that is based on the facial landmark count, and cause a display device to display the frame, a network interface to transmit the frame, or a combination thereof.

Referring now to FIG. 1, a flow diagram depicting a method 100 for an electronic device to control visibility of frames is provided, in accordance with various examples. The method 100 includes a start point 102 at which the electronic device starts a process for processing a frame captured by an image sensor. During a receive process 104 of the method 100, the electronic device receives the frame from the image sensor. The electronic device determines an aspect ratio of the frame during a determine process 106 of the method 100. The electronic device decomposes the frame during a decompose process 108 of the method 100. During a detect process 110 of the method 100, the electronic device detects facial features of the decomposed frame. Utilizing the detected facial features, the electronic device determines a facial landmark count during a determine process 112 of the method 100. At a decision point 114 of the method 100, the electronic device determines whether the facial landmark count exceeds a threshold. Responsive to a determination that the facial landmark count does not exceed the threshold (e.g., the facial landmark count is less than the threshold), the electronic device adjusts a visibility of the frame during an adjust process 116 of the method 100. The electronic device causes a display device to display the frame having the adjusted visibility during a display process 118. Responsive to a determination that the facial landmark count exceeds the threshold (e.g., the facial landmark count is equivalent to or greater than the threshold), the electronic device causes the display device to display the frame as received during the receive process 104.

In some examples, the start point 102 occurs in response to an application requesting access to an image sensor. The application is a videoconferencing application, for example. As described herein, the terms "application," "software," and "firmware" are considered to be interchangeable in the context of the examples provided. "Firmware" is considered to be machine-readable instructions that a processor of the electronic device executes prior to execution of the operating system (OS) of the electronic device, with a small portion that continues after the OS bootloader executes (e.g., a callback procedure). "Application" and "software" are considered broader terms than "firmware," and refer to machine-readable instructions that execute after the OS bootloader starts, through OS runtime, and until the electronic device shuts down. "Application," "software," and "firmware," as used herein, are referred to as executable code.

During the receive process 104, the electronic device intercepts the video signal of the image sensor. In various examples, the electronic device intercepts the video signal in response to an application requesting access to the image sensor, a determination that the video signal includes a user presence, or a combination thereof.

During the determine process 106, the electronic device determines a width and a height of the frame received during the receive process 104. In some examples, the electronic device determines the aspect ratio as a ratio of the width to the height of the frame. In various examples, the aspect ratio is 1.43:1, 4:3, 9:16, 16:9, 16:10, 18:9, 18.5:9, 21:9, or any other comparable digital aspect ratio utilized by image sensors. In other examples, the electronic device determines the aspect ratio as a ratio of the width in pixels to the height in pixels. For example, the aspect ratio is 640:480, 1280:780, 1920:1080, 2048:1080, 2560:1440, or any other comparable pixel aspect ratio utilized by image sensors. The electronic device determines coordinates of the frame captured by the image sensor based on the width and height, for example.

In various examples, during the decompose process 108, the electronic device decomposes the frame utilizing a pre-processing technique. Decomposing, as used herein, reduces objects to edge-like structures. Examples of pre-processing techniques include grayscaling, blurring, sharpening, thresholding, or a combination thereof. Grayscaling, as used herein, converts the frame to gray tonal values. Blurring, as used herein, utilizes a low pass filter to remove noise, or outlier pixels, from the frame. Sharpening, as used herein, enhances a contrast along edges of objects of the frame. Thresholding, as used herein, separates the frame into foreground values of black and background values of white. Post-thresholding, the frame is reduced to edge-like structures denoted by black pixels, for example.

To detect the facial features during the detect process 110, the electronic device utilizes a face detection technique to detect facial features of the user in the frame received during the receive process 104. In some examples, the electronic device utilizes a face detection technique to determine whether low intensity regions of the decomposed frame include facial features during the detect process 110. The low intensity regions are areas of the frame that have similar intensity values such that darkened faces or features are difficult to detect. The low intensity region is a shadowed area captured by the image sensor, for example. The electronic device utilizes the locations of the facial features to determine coordinates for facial landmark points. For example, a first facial feature is an eyebrow. The electronic device determines coordinates that overlap the location of the eyebrow, that are contiguous to the location of the eyebrow, or a combination thereof. The electronic device increments a facial landmark count for each facial landmark point having coordinates within the width and height of the frame determined during the determine process 106. Within, as used herein, includes coordinate inside the boundary defined by the width and height of the frame in terms of pixels, as well as coordinates of the boundary.

In various examples, at the decision point 114, the electronic device determines whether the facial landmark count exceeds a threshold. Exceeds a threshold, as used herein, includes a value that is equivalent to the threshold as well as values that are greater than the threshold. The threshold is a percentage of a total number of facial landmark points, for example. In some examples, the electronic device determines the total number of facial landmark points by extrapolating from the coordinates of the facial landmark points and an approximate symmetry of facial features. In an example, the total number of facial landmark points is 400, the facial landmark count is 250, and the threshold is 300, or 75% of 400. Thus, the electronic device determines that the facial landmark count of 250 does not exceed the threshold of 300. In some examples, the threshold is adjustable utilizing a graphical user interface (GUI).

While in the examples described above the electronic device performs the determine process 106 and the decompose process 108 simultaneously, in other examples, the electronic device performs the determine process 106 and the decompose process 108 sequentially. While in the examples described above the electronic device performs the decompose process 108, the detect process 110, and the determine process 112, sequentially, in other examples, the electronic device performs the decompose process 108, the detect process 110, and the determine process 112 concurrently. For example, the electronic device utilizes a machine learning technique to decompose the frame, detect the facial features, determine the facial landmark count, or a combination thereof. To decompose the frame, the machine learning technique compares the facial features to multiple templates to determine that the features indicate a face. In various examples, the electronic device utilizes a machine learning technique that implements a convolution neural network (CNN) to determine whether the image includes the face. The CNN is trained with a training set that includes multiple images of multiple users, for example. The multiple images include users having different facial positions. Utilizing the trained CNN, the electronic device identifies facial features of the image, determines facial landmark points of the facial features, and determines the facial landmark count. In some examples, the CNN implements a Visual Geometry Group (VGG) network, a Residual Network (ResNet) network, a SqueezeNet network, an AlexNet network, or a LeNet network. The electronic device utilizes the total number of facial landmark points of the trained CNN to determine the threshold, in some examples. For example, the trained CNN has a total number of facial landmark points (e.g., 68, 98, 468) based on a model utilized. In another example, the machine learning technique utilizes a pipeline that includes a face detector and a facial landmark model to detect the facial features and determine the facial landmark count. The machine learning technique utilizing the pipeline is MediaPipe Face Mesh or a comparable face geometry solution, for example. The machine learning pipeline determines a three-dimensional (3D) surface geometry of a face represented in the frame. The 3D surface geometry utilizes a grid to generate coordinates of facial landmark points and to determine a total number of facial landmark points.

In some examples, during the adjust process 116, the electronic device generates a duplicate of the frame received during the receive process 104 and adjusts the visibility of the duplicate frame. During the display process 118, the electronic device causes the display device to display the duplicate frame. In other examples, the electronic device utilizes post-processing techniques to adjust the visibility of the frame received during the receive process 104. To adjust the visibility of the frame, the post-processing techniques adjust a brightness, a contrast, a saturation, a hue, a fade, a vignette, or a combination thereof of the frame, for example. During the display process 118, the electronic device causes the display device to display the post-processed frame.

Figure 2:
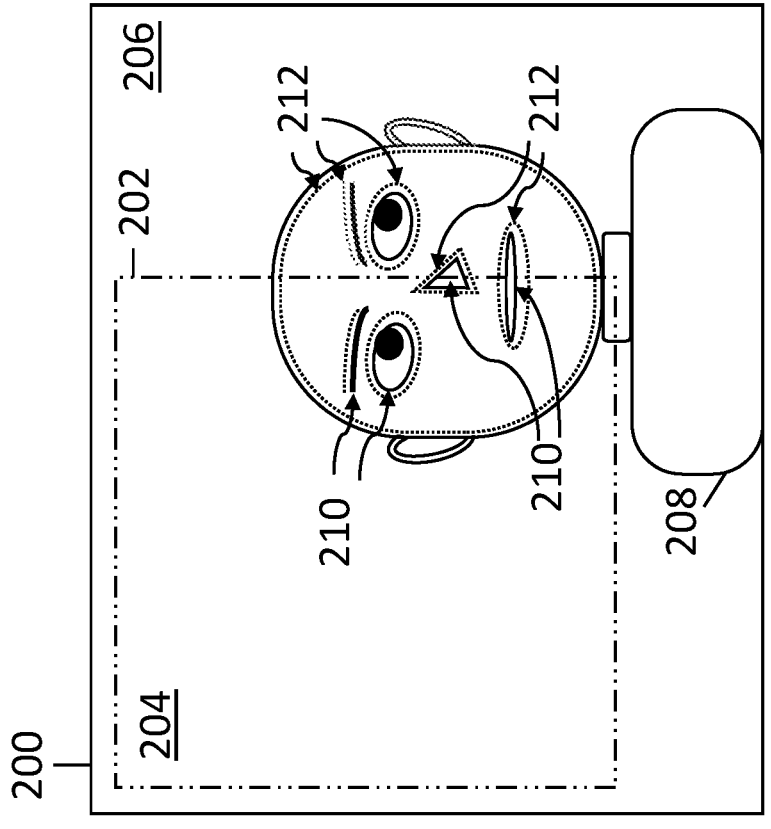
FIG. 2 is a frame utilized by an electronic device for controlling visibility of frames, in accordance with various examples.

Referring now to FIG. 2, a frame 202 utilized by an electronic device for controlling visibility of frames is provided, in accordance with various examples. The frame 202 includes an area 204 of an environment 200. The environment 200 includes areas 204, 206 and a user 208. The user 208 has facial features 210 and facial landmark points 212. The facial features 210 include eyes, eyebrows, a nose, and a mouth, for example. The facial landmark points 212 include coordinates that outline the facial features 210, for example.

In various examples, the frame 202 outlines a field of view of an image sensor. The field of view of the image sensor captures the area 204. The area 204 includes a partial face of the user 208. The electronic device receives the frame 202 from the image sensor and determines an aspect ratio of the frame 202. The electronic device decomposes the frame 202 to detect the facial features 210 of the frame 202. Utilizing the detected facial features 210, the electronic device determines a facial landmark count of the facial landmark points 212 of the frame 202. The electronic device determines whether the facial landmark count exceeds a threshold. Responsive to a determination that the facial landmark count does not exceed the threshold, the electronic device adjusts a visibility of the frame 202 and causes a display device to display the frame 202 having the adjusted visibility. Responsive to a determination that the facial landmark count exceeds the threshold, the electronic device causes the display device to display the frame 202 as received from the image sensor.

Figure 3:
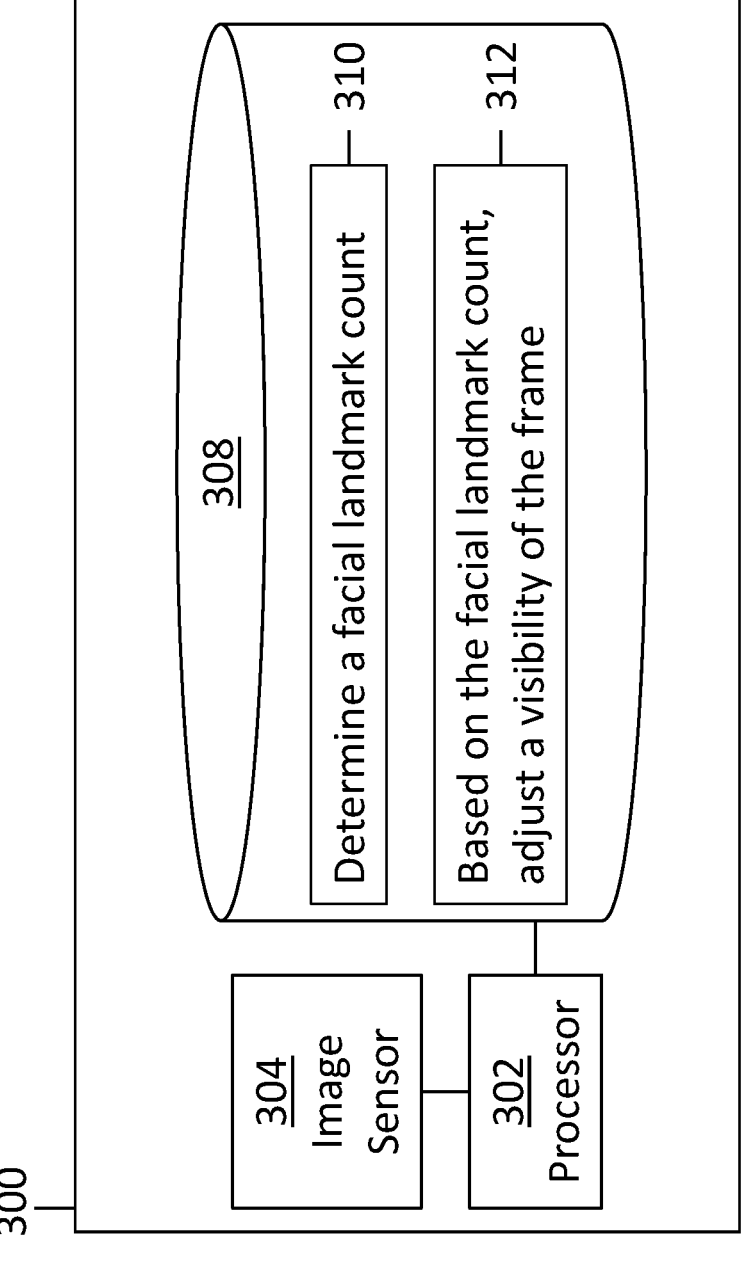
FIG. 3 is a schematic diagram depicting an electronic device for controlling visibility of frames, in accordance with various examples.

Referring now to FIG. 3, a schematic diagram depicting an electronic device 300 for controlling visibility of frames is provided, in accordance with various examples. The electronic device 300 is a desktop, a laptop, a notebook, a tablet, a smartphone, or any other suitable computing device for receiving and processing frames. The electronic device 300 includes a processor 302, an image sensor 304, and a storage device 308. The processor 302 is a microprocessor, a microcomputer, a microcontroller, or another suitable processor or controller for managing operations of the electronic device 300. The processor 302 is a central processing unit (CPU), graphics processing unit (GPU), system on a chip (SoC), image signal processor (ISP), or a field programmable gate array (FPGA), for example. The image sensor 304 is an internal camera, an external camera, or any other suitable device for capturing an image, recording a video signal, or a combination thereof. The storage device 308 includes a hard drive, solid state drive (SSD), flash memory, random access memory (RAM), or other suitable memory for storing data or executable code of the electronic device 300.

While not explicitly shown, the electronic device 300 includes network interfaces, video adapters, sound cards, local buses, peripheral devices (e.g., a keyboard, a mouse, a touchpad, a speaker, a microphone, a display device), wireless transceivers, connectors, or a combination thereof. While the image sensor 304 is shown as an integrated image sensor of the electronic device 300, in other examples, the image sensor 304 couples to any suitable connection for enabling communications between the electronic device 300 and the image sensor 304. The connection may be via a wired connection (e.g., a Universal Serial Bus (USB)) or via a wireless connection (e.g., BLUETOOTH®, Wi-Fi®). In some examples, the display device is an integrated display device of the electronic device 300. In other examples, the display device couples to any suitable connection for enabling communications between the electronic device 300 and the display device. The display device is a liquid crystal display (LCD), a light-emitting diode (LED) display, a plasma display, a quantum dot (QD) display, or any suitable device for displaying data of the electronic device 300 for viewing. The connection may be via a wired connection (e.g., USB, a High-Definition Multimedia Interface (HDMI) connector, or a Video Graphics Array (VGA) connector, Digital Visual Interface (DVI)) or via a wireless connection (e.g., BLUETOOTH®, Wi-Fi®).

In some examples, the processor 302 couples to the image sensor 304, and the storage device 308. The storage device 308 stores machine-readable instructions which, when executed by the processor 302, cause the processor 302 to perform some or all of the actions attributed herein to the processor 302. The machine-readable instructions are the machine-readable instructions 310, 312.

In various examples, the machine-readable instructions 310, 312, when executed by the processor 302, cause the processor 302 to adjust a visibility of a frame (e.g., the frame 202). The machine-readable instruction 310, when executed by the processor 302, causes the processor 302 to determine a facial landmark count. Based on the facial landmark count, the machine-readable instruction 312, when executed by the processor 302, causes the processor 302 to adjust the visibility of the frame.

For example, the machine-readable instruction 310, when executed by the processor 302, causes the processor 302 to determine a facial landmark count of the frame captured by the image sensor 304. Responsive to determining the facial landmark count, the machine-readable instruction 312, when executed by the processor 302, causes the processor 302 to adjust the visibility of the frame. The processor 302 adjusts the visibility incrementally based on the facial landmark count relative to the total number of facial landmark points (e.g., the facial landmark points 212), for example.

Executing machine-readable instructions, the processor 302 implements the method 100 in some examples. For example, in response to an application requesting access to an image sensor, a machine-readable instruction (not explicitly shown), when executed by the processor 302, causes the processor 302 to intercept a video signal of the image sensor 304. Another machine-readable instruction (not explicitly shown), when executed by the processor 302, causes the processor 302 to isolate a frame of the video signal. Executing another machine-readable instruction (not explicitly shown) causes the processor 302 to determine an aspect ratio of the frame. Executing another machine-readable instruction (not explicitly shown) causes the processor 302 to decompose the frame. The processor 302 implements a technique described above with respect to FIG. 1 to decompose the frame, for example. Another machine-readable instruction (not explicitly shown), when executed by the processor 302, causes the processor 302 to detect facial features (e.g., the facial features 210). The processor 302 implements a technique described above with respect to FIG. 1 to detect the facial features, for example. The machine-readable instruction 310, when executed by the processor 302, causes the processor 302 to determine the facial landmark count by comparing coordinates of facial landmark points (e.g., the facial landmark points 212) to coordinates of pixels of the frame captured the image sensor 304, as described above with respect to FIG. 1, for example. Responsive to a determination that coordinates of a facial landmark point are within the frame captured by the image sensor 304, the processor 302 increments the facial landmark count. The machine-readable instruction 312, when executed by the processor 302, causes the processor 302 to determine whether the facial landmark count exceeds a threshold and to adjust, based on a result of the determination, the visibility of the frame, as described above with respect to FIG. 1.

In some examples, the processor 302 adjusts the visibility of the frame by a multiplier that is based on the facial landmark count. For example, responsive to the facial landmark count of 250 and a total number of facial landmark points of 400, the processor 302 determines the multiplier is 250 divided by 400, or 0.625. The processor 302 reduces the visibility of the frame by 0.375. In various examples, the processor 302 adjusts the visibility of the frame by the multiplier rounded to a nearest tenth or hundredth. For example, the processor 302 adjusts the visibility of the frame by 0.38 or 0.4.

In other examples, responsive to a number of subsequent frames that have a similar multiplier (e.g., multipliers are within a tolerance of each other) and that is less than a delay threshold, the processor 302 replaces the frame with a static image, a video, or a combination thereof. The number of subsequent frames is based on an elapsed time, for example. The number of subsequent frames is based on a frame rate of the image sensor 304, for example. Responsive to a frame rate of 30 frames per second and an elapsed time of 30 seconds, the processor 302 replaces the frame with a static image, a video, or a combination thereof after a delay threshold of 900 (e.g., 30×30). In various examples, the delay threshold, the number of subsequent frames, the elapsed time, or a combination thereof are adjustable utilizing a GUI.

In various examples, the processor 302 causes the display device (not explicitly shown) to display the frame having the adjusted visibility, a network interface (not explicitly shown) to transmit the frame having the adjusted visibility, or a combination thereof. In some examples, the processor 302 causes the display device (not explicitly shown) to display the frame captured by the image sensor 304 and a network interface to transmit the frame having the adjusted visibility.

Utilizing the electronic device 300 that adjusts the visibility of the frame based on the facial landmark count within the frame provides for an enhanced user and audience experience by reducing distractions for the audience. Enhancing the effectiveness of communication between the user and the audience enhances user productivity.

Figure 4:
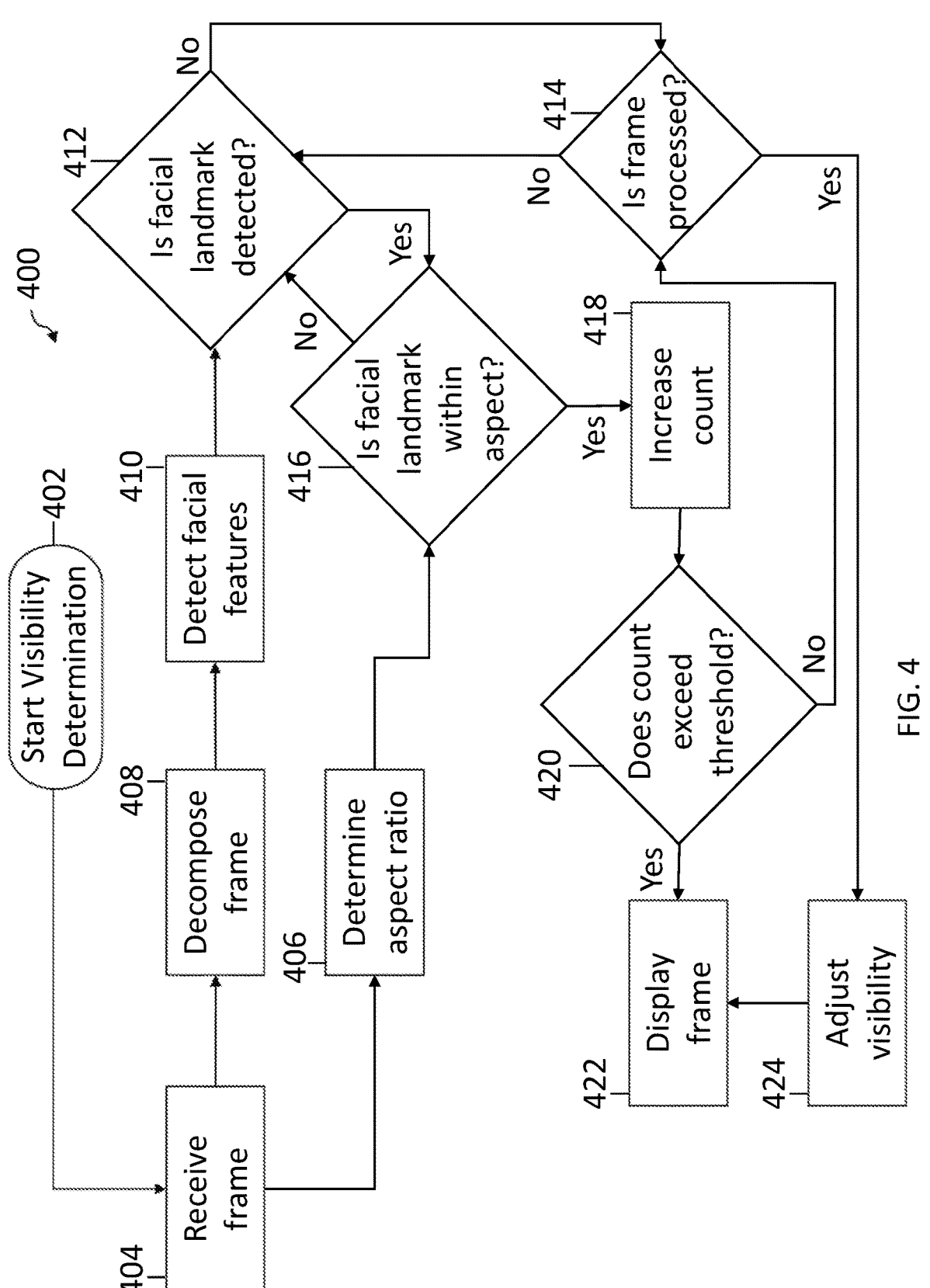
FIG. 4 is a flow diagram depicting a method for an electronic device to control visibility of frames, in accordance with various examples.

Referring now to FIG. 4, a flow diagram depicting of a method 400 for an electronic device (e.g., the electronic device 300) to control visibility of frames is provided, in accordance with various examples. The method 400 includes a start point 402 during which the electronic device starts processing a frame (e.g., the frame 202) captured by an image sensor (e.g., the image sensor 304). During a receive process 404 of the method 400, the electronic device receives the frame from the image sensor. The electronic device determines an aspect ratio of the frame during a determine process 406 of the method 400. The electronic device decomposes the frame during a decompose process 408 of the method 400. During a detect process 410 of the method 400, the electronic device detects facial features of the decomposed frame. Utilizing the detected facial features, the electronic device determines whether a facial landmark point is detected at a decision point 412 of the method 400. Responsive to a determination that the facial landmark point is not detected at the decision point 412, the electronic device determines whether the frame has been processed at a decision point 414 of the method 400. Responsive to a determination that the frame has not been processed at the decision point 414, the electronic device returns to the decision point 412 to determine whether another facial landmark point is detected.

Responsive to a determination at the decision point 412 that the facial landmark point is detected, the electronic device determines whether the facial landmark point is within the aspect ratio at a decision point 416 of the method 400. Responsive to a determination that the facial landmark point is not within coordinates of pixels of the frame during the decision point 416, the electronic device returns to the decision point 412 to determine whether another facial landmark point is detected. Responsive to a determination at the decision point 416 that the facial landmark point is within the coordinates of pixels of the frame, the electronic device increases a facial landmark count during an increase process 418. At a decision point 420 of the method 400, the electronic device determines whether the facial landmark count exceeds a threshold. Responsive to a determination at the decision point 420 that the facial landmark count exceeds the threshold, the electronic device causes a display device to display the frame received during the receive process 404. Responsive to a determination at the decision point 420 that the facial landmark count does not exceed the threshold, the electronic device returns to the decision point 414 to determine whether the frame is processed. Responsive to a determination at the decision point 414 that the frame is processed, the electronic device adjusts a visibility of the frame during an adjust process 424 of the method 400. The electronic device causes a display device to display the frame having the adjusted visibility during the display process 422. By utilizing the method 400, the electronic device reduces an amount of time to process the frame in examples in which the facial landmark count exceeds the threshold before the frame is processed.

Figures 5, 6:
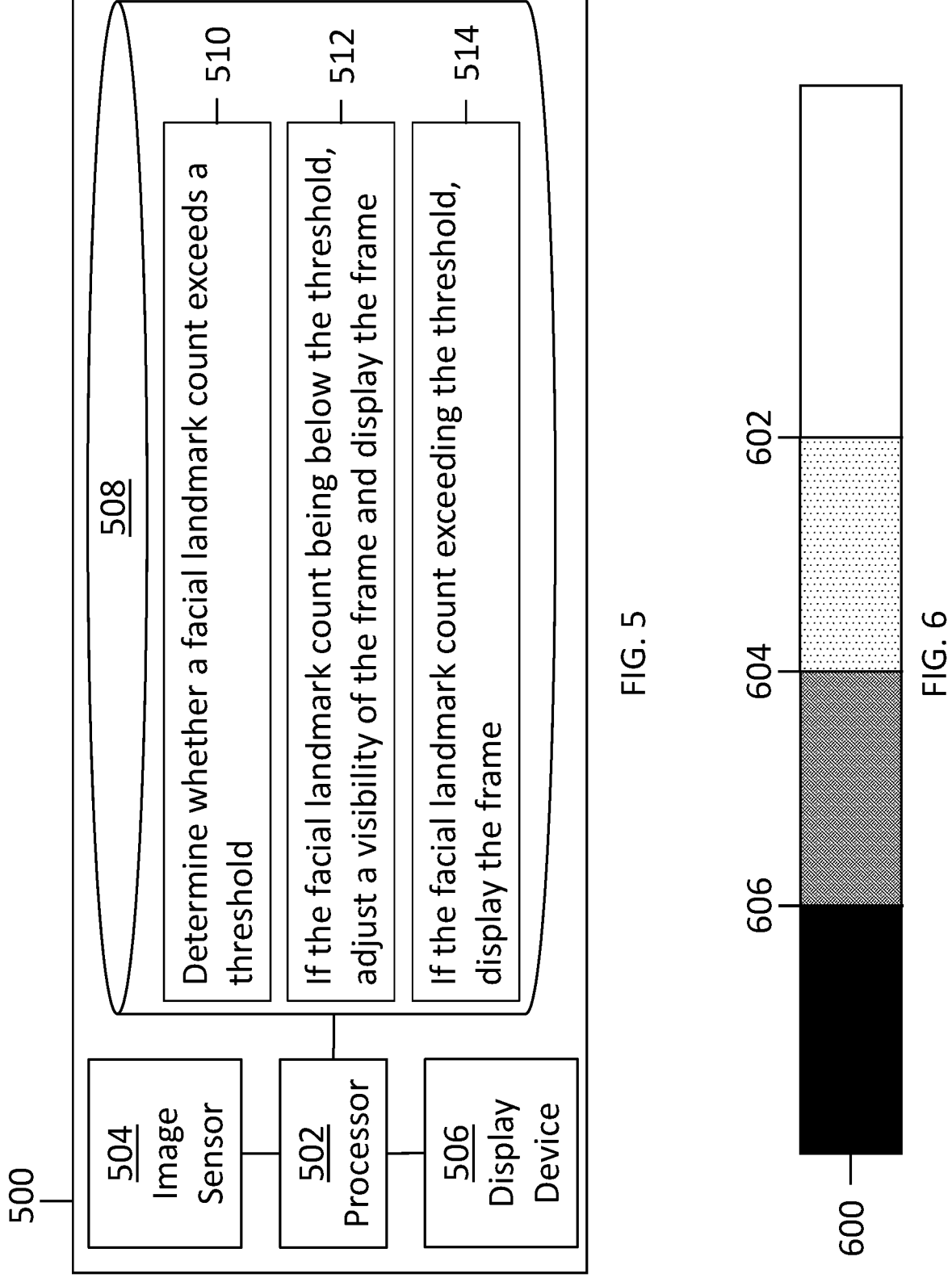
FIG. 5 is a schematic diagram depicting an electronic device for controlling visibility of frames, in accordance with various examples.
FIG. 6 is a graphical user interface of an electronic device for controlling visibility of frames, in accordance with various examples.

Referring now to FIG. 5, a schematic diagram depicting an electronic device 500 for controlling visibility of frames is provided, in accordance with various examples. The electronic device 500 is the electronic device 300, for example. The electronic device 500 includes a processor 502, an image sensor 504, a display device 506, and a storage device 508. The processor 502 is the processor 302, for example. The image sensor 504 is the image sensor 304, for example. The display device 506 is a liquid crystal display (LCD), a light-emitting diode (LED) display, a plasma display, a quantum dot (QD) display, or any suitable device for displaying data of the electronic device 300 for viewing. The storage device 508 is the storage device 308, for example.

In some examples, the processor 502 couples to the image sensor 504, the display device 506, and the storage device 508. The storage device 508 stores machine-readable instructions which, when executed by the processor 502, cause the processor 502 to perform some or all of the actions attributed herein to the processor 502. The machine-readable instructions are the machine-readable instructions 510, 512, 514.

In various examples, the machine-readable instructions 510, 512, 514, when executed by the processor 502, cause the processor 502 to adjust a visibility of a frame (e.g., the frame 202). The machine-readable instruction 510, when executed by the processor 502, causes the processor 502 to determine whether a facial landmark count exceeds a threshold. Responsive to the facial landmark count being less than the threshold, the machine-readable instruction 512, when executed by the processor 502, causes the processor 502 to adjust the visibility of the frame and cause the display of the frame. Responsive to the facial landmark count exceeding the threshold, the machine-readable instruction 514, when executed by the processor 502, causes the processor 502 to cause the display of the frame.

For example, the machine-readable instructions 510, 512, 514, when executed by the processor 502, cause the processor 502 to adjust a visibility of a frame (e.g., the frame 202). The machine-readable instruction 510, when executed by the processor 502, causes the processor 502 to determine whether a facial landmark count of the frame captured by the image sensor 504 exceeds a threshold. Responsive to a determination that the facial landmark count is less than the threshold, the machine-readable instruction 512, when executed by the processor 502, causes the processor 502 to adjust a visibility of the frame and cause the display device 506 to display the frame that has the adjusted visibility. Responsive to a determination that the facial landmark count exceeds the threshold, the machine-readable instruction 514, when executed by the processor 502, causes the processor 502 to cause the display device 506 to display the frame captured by the image sensor 504.

In some examples, responsive to a determination that the facial landmark count is less than the threshold, the processor 502 causes a network interface (not explicitly shown) to transmit the frame that has the adjusted visibility. Responsive to a determination that the facial landmark count exceeds the threshold, the processor 502 causes the network interface (not explicitly shown) to transmit the frame captured by the image sensor 504.

As described above with respect to FIG. 3, in some examples, the processor 502 adjusts the visibility of the frame by a multiplier that is based on the facial landmark count. As described with respect to FIGS. 1 and 6, the threshold is adjustable utilizing a GUI, in various examples.

Referring now to FIG. 6, a graphical user interface (GUI) 600 of an electronic device (e.g., the electronic device 300, 500) for controlling visibility of frames is provided, in accordance with various examples. The GUI 600 includes a first threshold 602, a second threshold 604, and a third threshold 606. The GUI 600 enables a user of the electronic device to adjust the first threshold 602, the second threshold 604, the third threshold 606, or a combination thereof. For example, the GUI 600 is a slider that represents a range of fade from zero to 100. The first threshold 602 is adjusted to a value that defines an upper range (e.g., 66 to 100), the second threshold 604 is adjusted to a value that defines a first middle range (e.g., 45 to 65) and a second middle range (e.g., 26 to 44), and the third threshold 606 is adjusted to a value that defines a lower range (e.g., zero to 25). The upper range has a fade represented by a white background, the first middle range has a fade represented by a black-dotted white background, the second middle range has a fade represented by a gray background, and the lower range has a fade represented by a black background, for example. The white background represents no fade (e.g., an opacity of the frame of 100%) and the black background represents a fade to black (e.g., an opacity of the frame of 0%), for example.

In some examples, a processor (e.g., the processor 302, 502) of the electronic device determines whether a first facial landmark count of a first frame (e.g., the frame 202) captured by the image sensor (e.g., the image sensor 304, 504) exceeds the first threshold 602. Responsive to a determination that the first facial landmark count is less than the first threshold 602, the processor adjusts a first visibility of the first frame and causes a display device (e.g., the display device 506) to display the frame that has the first visibility. In various examples, the processor calculates a percentage by dividing the first facial landmark count by a total number of facial landmark points, compares the percentage to the first middle range, the second middle range, and the lower range to determine a range of the percentage, and adjusts the visibility of the frame by applying the fade associated with the range of the percentage. Responsive to a determination that the first facial landmark count exceeds the first threshold 602, the processor causes the display device to display the frame captured by the image sensor.

In various examples, the processor determines whether a second facial landmark count of a second frame captured by the image sensor exceeds the second threshold 604. Responsive to a determination that the second facial landmark count is less than the second threshold 604, the processor adjusts a second visibility of the second frame and causes the display device to display the second frame that has the second visibility. Responsive to a determination that the second facial landmark count exceeds the second threshold 604, the processor determines whether the second facial landmark count exceeds the first threshold 602. Responsive to a determination that the second facial landmark count is less than the first threshold 602, the processor adjusts the second visibility of the second frame to the first visibility of the first frame and causes the display device to display the second frame that has the second visibility. Responsive to a determination that the second facial landmark count exceeds the first threshold 602, the processor causes the display device to display the second frame captured by the image sensor.

In other examples, responsive to a determination that the facial landmark count is less than the first threshold 602, the processor reduces the visibility of the frame by 25%. Responsive to a determination that the facial landmark count is less than the second threshold 604, the electronic device reduces the visibility of the frame by 50%. Responsive to a determination that the facial landmark count is less than the third threshold 606, the electronic device reduces the visibility of the frame by 100%.

Figure 7B:
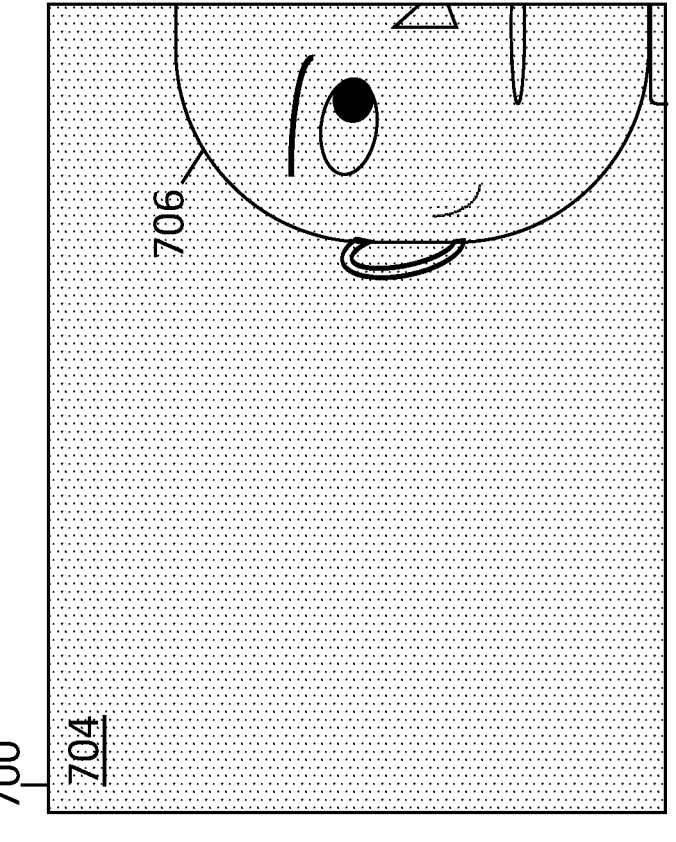
FIGS. 7A and 7B are schematic diagrams of a display device of an electronic device for controlling visibility of frames, in accordance with various examples.
Figure 7A:
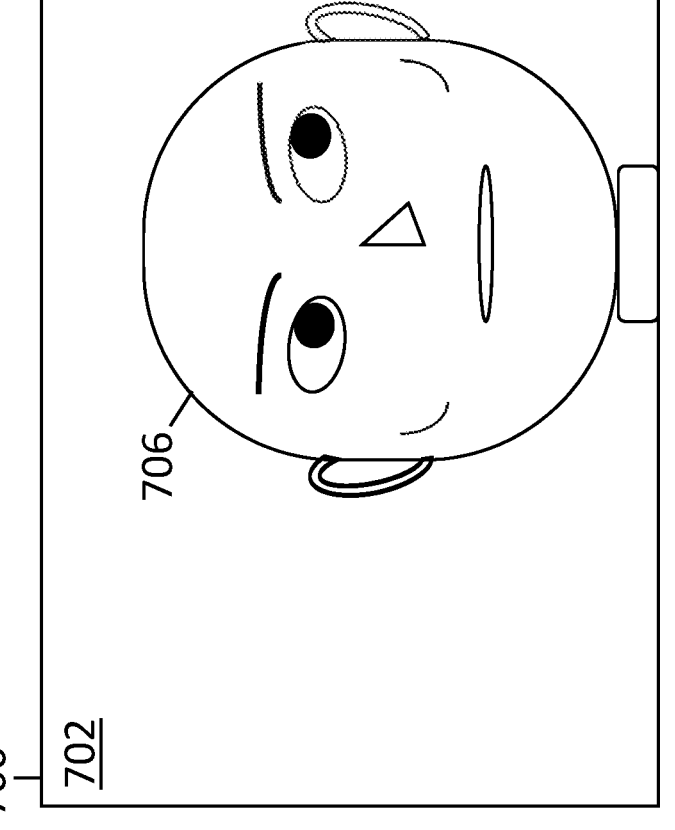

Referring now to FIGS. 7A and 7B, schematic diagrams depicting a display device 700 of an electronic device (e.g., the electronic device 300, 500) for controlling visibility of frames 702, 704 are provided, in accordance with various examples. FIG. 7A shows the display device 700 displaying a frame 702 that includes a user 706. FIG. 7B shows the display device 700 displaying a frame 704 of the user 706. The frame 704 is a subsequent frame to the frame 702, for example.

In various examples, a processor (e.g., the processor 302, 502) of the electronic device determines that a facial landmark count of the frame 702 exceeds a threshold and causes the display device 700 to display the frame 702 captured by an image sensor (e.g., 304, 504). The visibility of the frame 702 is 100% or has no visibility adjustments, for example. The processor determines that a facial landmark count of the frame 704 is less than the threshold and causes the display device 700 to display the frame 704 having an adjusted visibility, as represented by the black-dotted white background. The adjusted visibility is based on the facial landmark count as described above with respect to FIG. 1, a multiplier as described above with respect to FIG. 3, a comparison to ranges established by multiple thresholds as described above with respect to FIG. 6, or a combination thereof.

Figure 8:
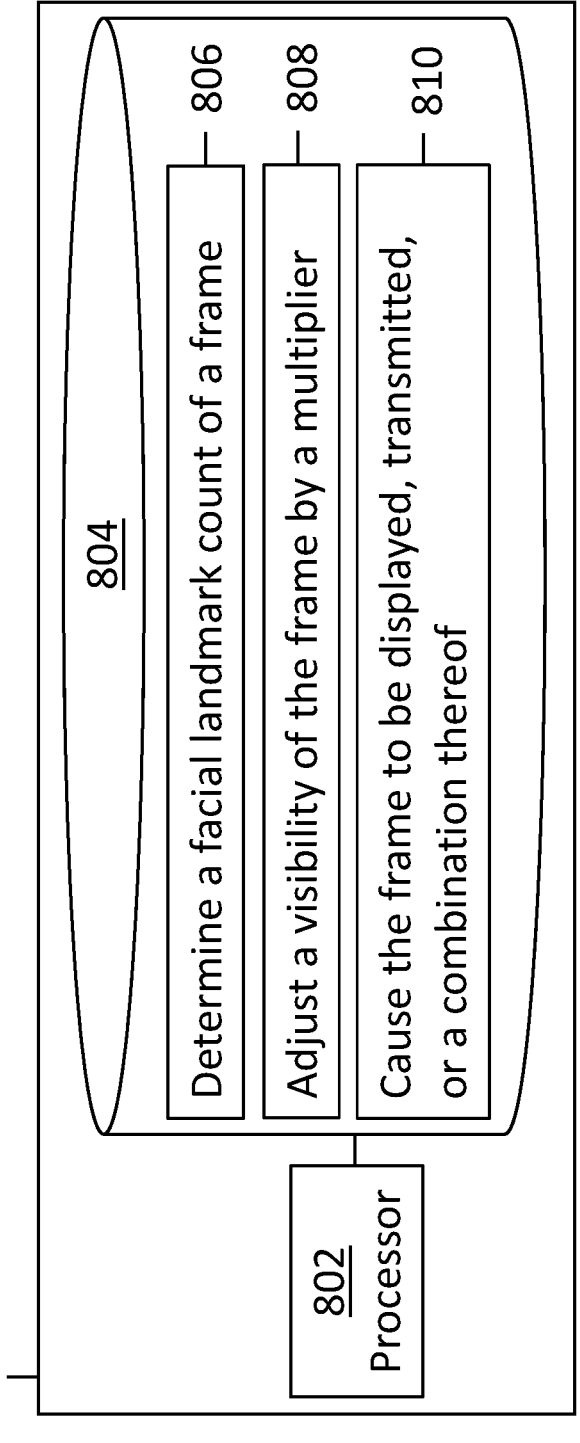
FIG. 8 is a schematic diagram depicting an electronic device to control visibility of frames, in accordance with various examples.

Referring now to FIG. 8, a schematic diagram depicting an electronic device 800 for controlling visibility of frames is provided, in accordance with various examples. The electronic device 800 is the electronic device 300, 500, for example. The electronic device 800 includes a processor 802 and a non-transitory machine-readable medium 804. The processor 802 is the processor 302, 502, for example. The non-transitory machine-readable medium 804 is the storage device 308, 508, for example. The term "non-transitory" does not encompass transitory propagating signals.

In various examples, the processor 802 couples to the non-transitory machine-readable medium 804. The non-transitory machine-readable medium 804 stores machine-readable instructions. The machine-readable instructions are the machine-readable instructions 806, 808, 810. The machine-readable instructions 806, 808, 810, when executed by the processor 802, cause the processor 802 to perform some or all of the actions attributed herein to the processor 802.

In some examples, when executed by the processor 802, the machine-readable instructions 806, 808, 810 cause the processor 802 to adjust a visibility of a frame (e.g., the frame 202, 702, 704). The machine-readable instruction 806, when executed by the processor 802, causes the processor 802 to determine a facial landmark count of the frame. The machine-readable instruction 808, when executed by the processor 802, causes the processor 802 to adjust a visibility of the frame by a multiplier. The machine-readable instruction 810, when executed by the processor 802, causes the processor 802 to cause the frame to be displayed, transmitted, or a combination thereof.

For example, the machine-readable instruction 806, when executed by the processor 802, causes the processor 802 to determine a facial landmark count of the frame captured by an image sensor (e.g., the image sensor 304, 504). The machine-readable instruction 808, when executed by the processor 802, causes the processor 802 to adjust a visibility of the frame by a multiplier that is based on the facial landmark count. The machine-readable instruction 810, when executed by the processor 802, causes the processor 802 to cause a display device (e.g., the display device 506, 700) to display the frame, a network interface (not explicitly shown) to transmit the frame, or a combination thereof.

In various examples, the processor 802 determines whether an audio signal captured by a microphone (not explicitly shown) includes an indicator, and responsive to a determination that the indicator is absent, mutes the microphone. The processor 802 utilizes a machine learning technique to identify the indicator, for example. The indicator is a topic of discussion, a phrase, or a keyword that indicates a user is engaging in conversation with the audience. The machine learning technique utilizes a speech recognition technique, a speech model, or a combination thereof to identify the topic, the phrase, or the keyword, for example. The speech recognition technique utilizes a Hidden Markov Model (HMM) to recognize patterns in the audio data of the audio signal, in some examples. The speech model accounts for grammar, vocabulary, or a combination thereof, for example.

In some examples, the electronic device determines whether the facial landmark count in relation to the total number of facial landmark points exceeds a multiplier. For example, given the total number of facial landmark points is 400, the facial landmark count is 250, and the multiplier is 0.75, the electronic device determines that a result of 250 divided by 400 (e.g., 0.625) does not exceed the multiplier. In some examples, the processor 802 mutes the microphone responsive to the multiplier being less than a threshold and unmutes the microphone responsive to the multiplier exceeding the threshold. In various examples, as described above with respect to FIGS. 1 and 6, whether to mute or unmute the microphone is adjustable utilizing a GUI.

In other examples, the processor 802 adjusts the visibility of the frame by a multiplier that is based on the facial landmark count responsive to a determination that an eye gaze direction of a user in the frame is away from the display device. For example, the processor 802 utilizes a tracking technique (e.g., an eye tracking technique, a gaze tracking technique, or a combination thereof) to determine the eye gaze direction based on a location of facial landmark points (e.g., the eyes), as determined utilizing the face detection technique described above with respect to FIG. 1. Utilizing the face detection technique, the machine learning technique, or a combination thereof described above with respect to FIG. 1, the processor 802 identifies eyes of a user (e.g., the user 208, 706) in the frame recorded by the image sensor. The processor 802 determines locations of the facial landmark points. Based on the locations of the facial landmark points relative to a location of an intersection of an optical axis of the image sensor with the user, the processor 802 determines the eye gaze direction of the user. The optical axis, as used herein, is an imaginary line along which there is a degree of rotational symmetry in the image sensor. In another example, the processor 802 causes the image sensor to emit an infrared light. The image sensor detects a reflection of the infrared light. The processor 802 analyzes data of the reflection to determine the eye gaze angle. In various examples, the processor 802 utilizes a machine learning technique that utilizes two levels of CNNs. The first level CNN detects facial features. The second level CNN refines a number of points around the eyes and mouth to enhance an accuracy of the technique. The machine learning technique utilizes a transform to calculate a pitch, a yaw, and a roll for angles of the face. The machine learning technique identifies the eye landmarks and locate the iris utilizing the eye landmarks. Utilizing a location of the iris, the machine learning technique determines the eye gaze angle. In such examples, while determining an eye gaze angle for a frame of a first image sensor of the multiple image sensors, the electronic device detects facial features and eye landmarks of a frame of a second image sensor of the multiple image sensors.

The method 100, 400 is implemented by machine-readable instructions stored to a storage device (e.g., the storage device 308, 508, the non-transitory machine-readable medium 804) of an electronic device (e.g., the electronic device 300, 500, 800), in various examples. A processor (e.g., the processor 302, 502, 802) of the electronic device executes the machine-readable instructions to perform the method 100, 400, for example. A process, as used herein, refers to operations performed by execution of machine-readable instructions by the processor. A decision point, as used herein, refers to operations performed by execution of machine-readable instructions by the processor. Unless infeasible, some or all of the blocks (e.g., process, decision point) of the method 100, 400, may be performed concurrently or in different sequences. For example, the processor performs a block that occurs responsive to a command sequential to the block describing the command. In another example, the processor performs a block that depends upon a state of a component after the state of the component is enabled.

Values for thresholds and settings described in the above examples are determined during a manufacture process, for example. As described above with respect to FIGS. 1 and 6, an executable code provides a GUI to enable a user (e.g., the user 208, 706) of an electronic device (e.g., the electronic device 300, 500, 800) to adjust the thresholds and settings. The thresholds and settings are stored to a storage device (e.g., the storage device 308, 508, the non-transitory machine-readable medium 804) of the electronic device.

Utilizing the electronic device 300, 500, 800 that adjusts the visibility of the frame (e.g., the frame 202, 702, 704) based on the facial landmark count within the frame provides for an enhanced user and audience experience by reducing distractions for the audience. Enhancing the effectiveness of communication between the user and the audience enhances user productivity.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:

an image sensor; and a processor to:

determine a facial landmark count of a frame captured by the image sensor;

compare the facial landmark count to a first threshold and a second threshold, wherein the first threshold is greater than the second threshold; and adjust, based on the comparison, a visibility of the frame such that an opacity of the frame is adjusted.

2. The electronic device of claim 1, wherein the processor is to determine the facial landmark count by comparing coordinates of facial landmark points to coordinates of pixels of the frame.

3. The electronic device of claim 1, wherein the processor is to adjust the visibility of the frame by a multiplier that is based on the facial landmark count.

4. The electronic device of claim 1, wherein the processor is to cause a display device to display the frame having the adjusted visibility, a network interface to transmit the frame having the adjusted visibility, or a combination thereof.

5. The electronic device of claim 1, wherein the processor is to cause a display device to display the frame captured by the image sensor and a network interface to transmit the frame having the adjusted visibility.

6. The electronic device of claim 1, wherein the processor is to adjust the visibility of the frame by adjusting a percentage of opacity of the frame.

7. The electronic device of claim 1, wherein the processor is to adjust the visibility of the frame using a post-processing technique to adjust at least one of: a brightness, a contrast, a saturation, a hue, a fade, or a vignette.

8. The electronic device of claim 1, wherein the processor is to adjust the visibility of the frame by a multiplier that is based on the facial landmark count such that an amount of adjustment to the visibility of the frame increases as the facial landmark count decreases.

9. The electronic device of claim 1, wherein the processor is to:

receive the frame captured by the image sensor;

determine an aspect ratio of the frame, wherein the aspect ratio is a ratio of a width to a height of the frame;

determine a set of coordinates of the frame based on the aspect ratio;

execute a pre-processing technique to decompose the frame such that objects included in the frame are reduced to edge-like structures; and detect, using a face detection technique, at least one facial feature in the decomposed frame, wherein the facial landmark count is determined based on the at least one facial feature detected in the decomposed frame.

10. An electronic device, comprising:

an image sensor; and a processor to:

determine whether a first facial landmark count of a first frame captured by the image sensor exceeds a first threshold;

responsive to a first determination that the first facial landmark count is less than the first threshold, adjust an opacity of the frame and cause a display device to display the frame that has a first opacity;

responsive to a determination that the first facial landmark count exceeds the first threshold, cause the display device to display the frame;

determine whether a second facial landmark count of a second frame captured by the image sensor exceeds a second threshold;

responsive to a determination that the second facial landmark count is less than the second threshold, adjust a second opacity of the second frame and cause the display device to display the second frame that has the second opacity; and responsive to a determination that the second facial landmark count exceeds the second threshold, determine whether the second facial landmark count exceeds the first threshold;

responsive to a determination that the second facial landmark count is less than the first threshold, adjust the second opacity of the second frame to the first opacity of the first frame and cause the display device to display the second frame that has the second opacity; and responsive to a determination that the second facial landmark count exceeds the first threshold, cause the display device to display the second frame captured by the image sensor.

11. The electronic device of claim 10, wherein the first threshold and the second threshold are adjustable utilizing a graphical user interface.

12. The electronic device of claim 10, wherein the processor is to:

responsive to a determination that the first facial landmark count is less than the first threshold, cause a network interface to transmit the first frame that has the first opacity; and responsive to a determination that the first facial landmark count exceeds the first threshold, cause the network interface to transmit the first frame captured by the image sensor.

13. The electronic device of claim 10, wherein the processor is to adjust the opacity of the frame by a multiplier that is based on the first facial landmark count and the second landmark count.

14. The electronic device of claim 10, wherein the first threshold and the second threshold are percentages of a total number of facial landmark points.

15. A non-transitory machine-readable medium storing machine-readable instructions which, when executed by a processor of an electronic device, cause the processor to:

determine a facial landmark count of a frame captured by an image sensor;

determine whether the facial landmark count exceeds a first threshold;

adjust, responsive to determining that the facial landmark count is less than the first threshold, a visibility of the frame to a first opacity by a multiplier;

determine whether the facial landmark count exceeds a second threshold;

adjust, responsive to determining that the facial landmark count is less than the second threshold, the visibility of the frame to a second opacity using the multiplier; and cause at least one of: a display device to display the frame; or a network interface to transmit the frame.

16. The non-transitory machine-readable medium of claim 15, wherein the processor is to:

determine whether an audio signal captured by a microphone includes an indicator, and responsive to a determination that the indicator is absent, mute the microphone.

17. The non-transitory machine-readable medium of claim 16, wherein whether to mute or unmute the microphone is adjustable utilizing a graphical user interface.

18. The non-transitory machine-readable medium of claim 15, wherein, responsive to a determination that an eye gaze direction of a user in the frame is away from the display device, the processor is to adjust the visibility of the frame by the multiplier that is based on the facial landmark count.

19. The non-transitory machine-readable medium of claim 15, wherein the processor is to:

mute a microphone responsive to the multiplier being less than the first threshold; and unmute the microphone responsive to the multiplier exceeding the first threshold.

* * * * *